United States Patent Office 3,267,766
Patented August 23, 1966

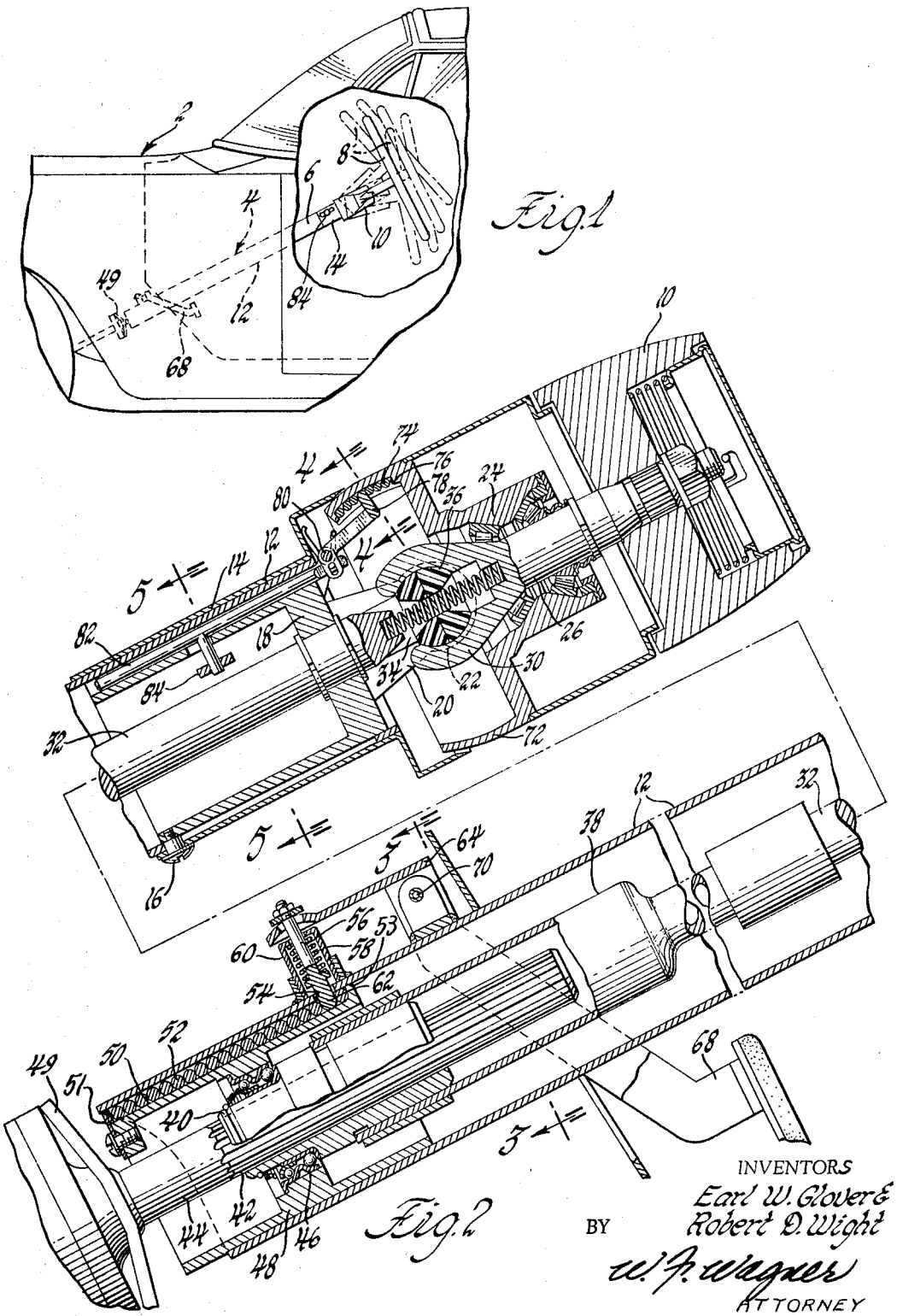

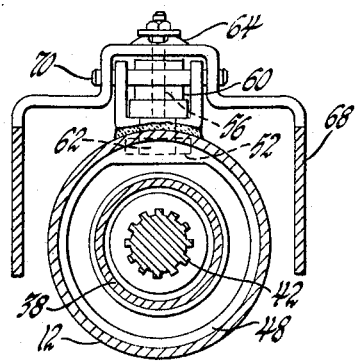
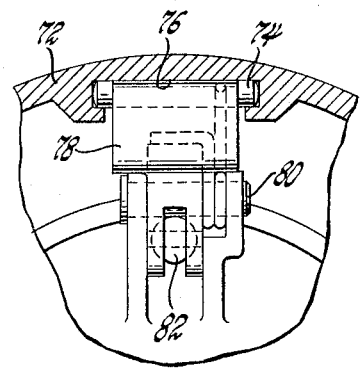
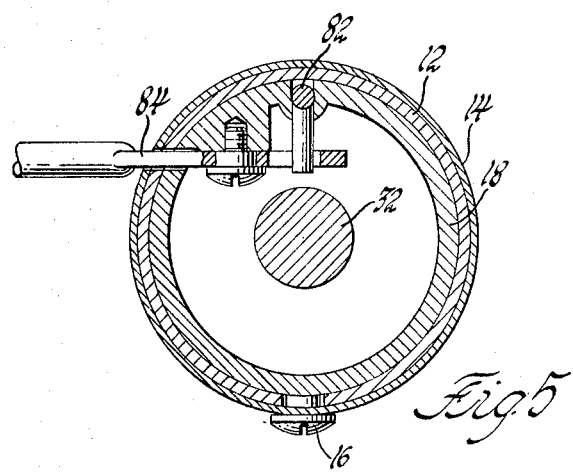
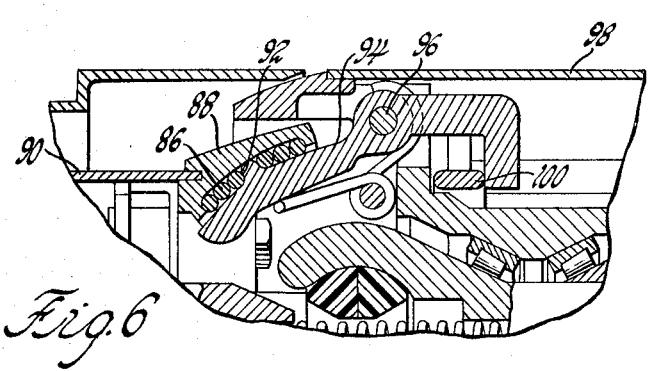

3,267,766
ADJUSTABLE STEERING COLUMN
Earl W. Glover and Robert D. Wight, Saginaw, Mich., assignors to General Motors Corporation, Detroit, Mich., a corporation of Delaware
Filed Aug. 21, 1964, Ser. No. 391,086
9 Claims. (Cl. 74—493)

This invention relates generally to adjustable steering columns and particularly, although not exclusively, to incremental latching mechanisms especially adapted for adjustable steering column assemblies.

As used herein, the expression "adjustable steering column assembly" denotes an assembly incorporating means enabling selective axial adjustment of the steering column and angular adjustment of the plane of rotation of the steering wheel relative to the axis of the steering column. The present invention is concerned with providing positive, rugged latching, yet fine increments of either or both modes of adjustment.

An object of the present invention is to provide an improved adjustable steering column assembly and latching means therefor.

Another object is to provide an adjustable steering column assembly incorporating locking or latching means of the plunger and slot type constructed and arranged so as to provide approximately twice the normal number of increments of adjustment available in conventional plunger and slot mechanisms.

A further object is to provide an arrangement of the stated character wherein the finer increments of adjustment are achieved while maintaining physical ruggedness and positive engagement.

A still further object is to provide latching means of the general type described adaptable to structures involving both linear and arcuate relative displacements.

These and other objects, advantages and features of the invention will become more readily apparent as reference is had to the accompanying specification and drawings wherein:

FIGURE 1 is a fragmentary schematic view of a vehicle equipped with a tilting and telescoping steering column incorporating the invention;

FIGURE 2 is an enlarged sectional elevational view of the steering column assembly illustrating the form and relationship of the parts thereof;

FIGURE 3 is a view looking in the direction of arrows 3—3 of FIGURE 2;

FIGURE 4 is a view looking in the direction of arrows 4—4 of FIGURE 2;

FIGURE 5 is a view looking in the direction of arrows 5—5 of FIGURE 2; and

FIGURE 6 is a greatly enlarged fragmentary sectional view illustrating a modified embodiment of the invention.

Referring now to the drawings and particularly FIGURE 1, reference numeral 2 generally designates a vehicle body in which is disposed a steering column assembly 4 of the so-called tilt and telescope type wherein a portion of the column 6 is axially telescopable to vary the length thereof, while the steering wheel 8 and hub portion 10 thereof are tiltable relative to the column 6 about a transverse axis fixed with respect to the upper portion of the column. In operation, the two modes of adjustment described enable the vehicle operator to select the most convenient elevation and angularity of the steering wheel to assure maximum comfort and freedom from fatigue. In order to obtain optimum benefits from the compound adjustment available in an assembly of this type, it will be apparent that a large number of increments of adjustment within the available range are necessary. However, since even very slight lack of rigidity in a steering column assembly is not only readily discernable and highly disconcerting to the operator, it is essential that each increment of adjustment be accomplished in a manner exhibiting maximum rigidity and freedom from accidental displacement. To accomplish this objective, not only in constructions of the type disclosed, but in virtually all other articulatable mechanisms, extremely rugged latching mechanisms are employed, one of the more familiar of which is the plunger and slot latch which commonly takes the form of a plunger arranged for reciprocating movement relative to a perpendicular elongated member having a series of uniformly spaced notches or depressions engageable by the plunger. While this type of latching mechanism provides adequat ruggedness, the number of increments of adjustment within a given range of movement is limited owing to the necessity of providing substantial spacing between each of the depressions. According to the present invention, all of the physical advantages of the plunger and slot latching mechanism are retained, while the total number of increments of adjustment provided thereby are approximately doubled.

As seen best in FIGURE 2, steering column assembly 4 comprises a fixed jacket 12 having telescoping portion 14 concentrically surrounding the upper end thereof. Disposed within jacket 12 and secured to portion 14 by machine screw 16 is a cylindrical support 18 having laterally spaced apart ears 20 which support trunnions 22. Trunnions 22 in turn pivotally support the upper housing 24 for tilting movement about a transverse axis defined by the trunnions. An upper stub shaft 26 rotatably mounted in housing 24 is connected at its upper end to steering wheel hub portion 10 and at its lower end is formed with a yoke portion 30. An intermediate steering shaft 32 is rotatably supported at its upper end in support 18 and has a yoke portion 34 similar to yoke 30, which yokes cooperate in crossed relation with a split slotted ball 36 to form a universal joint having a geometric center aligned with trunnions 22 thus enabling rotation of the steering wheel 8 to be imparted to intermediate steering shaft 32 irrespective of the angular relation between stub shaft 26 and intermediate shaft 32. At its lower end, shaft 32 engages the upper end of a tubular member 38, the lower end of which is connected to an internally splined sleeve 40. Sleeve 40 cooperates with the externally splined upper end portion 42 of a lower stub steering shaft 44 and engages a thrust and radial load bearing 46 mounted in a cylindrical support 48. The lower end of shaft 44 is connected through a rag type universal joint 49 to a conventional steering gear mechanism, not shown.

In accordance with the invention, the outer periphery of support 48 telescopes within the lower end of fixed jacket 12 and is provided with a longitudinally elongated recess 50 within which are caged, between the end wall abutment portions 51 and 53 thereof, a plurality of rollers 52. Jacket 12 in turn is formed with a slot 54 radially aligned with recess 50. A linearly reciprocal plunger member 56 extends through slot 54 and bottoms in elongated slot 50 so as to occupy a longitudinal space therein approximately equal to the diameter of the individual rollers 52. Plunger 56 is normally biased into the intersecting position shown by a spring 58 caged within a cup assembly 60 mounted on jacket 12 over slot 54. In order to achieve the maximum retaining capability and precision of adjustment, the lower end portion 62 of plunger 56 is dimensioned so as to totally occupy the longitudinal space in slot 50 not occupied by the rollers 52. Similarly, the clearance between slot 54 and the end portion 62 of plunger 56, while greatly exaggerated in the drawings, is preferably a precision fit.

In order to enable selective adjustment of the axial position of the telescoping portion 14, the plunger 56 is connected to the lever portion 64 of a pedal member 68 which is pivotally mounted at 70 on jacket 12. When the operator desires to axially displace the column, pedal 68 is subjected to downward foot pressure which withdraws plunger 56 to a level clearing the outer extremity of support 48 whereupon manual pressure exerted on the steering wheel 8 causes the portion 14, intermediate steering shaft 32, tubular member 38, and support 48 to move upwardly relative to fixed jacket 12. When the desired axial position has been attained, the pedal is released causing plunger 56 to re-enter slot 50. Due to the fact that the steering column is in an inclined position, the rollers 52 will of course seek the lowermost position in slot 50 and the plunger will, therefore, emerge into slot 50 between two adjacent rollers, thereby causing a certain portion of the rollers to be displaced upwardly in slot 50. However, as soon as plunger end 62 is fully bottomed in slot 50, the full longitudinal dimension of the slot will again be totally occupied, only the relative position of the plunger with respect to the rollers being changed. In this connection, it is to be particularly noted that the number of increments of adjustment of the axial position of the column exactly equal the number of rollers plus the plunger, whereas a comparable arrangement utilizing conventional permanently spaced slots would reduce the number of increments by one half. The latter comparison is based upon a construction where the notches have projections therebetween of approximately the same width as the notches in order to provide the physical strength normally required in such installations. However, even under such comparable circumstances, the present invention not only provides twice as many increments of adjustment but additionally provides a much higher degree of structural strength, since it does not depend for resistance to displacement upon the dimension of a single tooth or projection between depressions, but rather provide virtually a solid abutment equal to the combined dimensions of the rollers in the direction in which the load is applied.

In order to utilize the invention in regulating the angular inclination of the steering wheel 8, the housing 24 is provided with a truncated spherical portion 72 having a plurality of rollers 74 caged in a curved slot 76 generated in an arc described from the geometric center of the universal joint 36. A plunger element 78 is mounted for reciprocal arcuate movement about a fixed axis 80 on support 18 and is spring biased into the normal slot intersecting position. A rod actuator 82 is reciprocably mounted in support 18 and is operatively connected to a hand lever 84 so that upward lifting movement of the latter causes the plunger 78 to be withdrawn from the slot intersecting position to enable tilting adjustment of the plane of rotation of the steering wheel. Release of the lever 84 permits the plunger 78 to re-enter the curved slot 76 and re-position the rollers 74 in the manner previously described.

The embodiment shown in FIGURE 6 illustrates adaptation of the invention to the tilt mechanism shown in copending application Serial No. 221,833, entitled "Adjustable Steering Column," filed by Philip B. Zeigler et al., on September 6, 1962, now Patent 3,167,971. In the embodiment shown, the caged rollers 86 are supported in a fixed housing 88 at the upper end of a steering jacket 90. The plunger element 92 is formed on an outwardly biased arcuately inwardly swingable lever member 94 pivoted at 96 on the tiltable upper portion 98. Inward displacement of lever 94 is accomplished by rocking displacement of a ring member 100. Inasmuch as additional details of construction of the tilt mechanism of the indicated application form no part of the invention, further description thereof is omitted.

While several embodiments of the invention have been shown and described, it will be apparent that other changes and modifications may be made therein. It is, therefore, to be understood that it is not intended to limit the invention to the embodiments shown, but only by the scope of the claims which follow.

We claim:

1. In combination with a pair of members arranged for relative movement such that at least one spatial relation therebetween remains constant, incremental latching means for adjustably positioning said members through a predetermined range of relative movement comprising a recessed track of finite length formed in one of said members along a path parallel to the direction of movement thereof, a plunger element mounted on the other of said members for movement through a path perpendicular to the path of said track, a plurality of rollers caged in said track movable along the path thereof, said plunger being normally biased so as to intersect said track and dimensioned so that said rollers occupy the entire length of said track when said plunger is in the biased position, and means for displacing said plunger from said normally biased position.

2. In combination with a pair of concentrically disposed members arranged for relative axial movement, incremental latching means for adjustably positioning said members through a predetermined range of said relative movement comprising a recessed track of finite length formed in one of said members along a path parallel to the direction of movement thereof, a plunger element mounted on the other of said members for movement through a path perpendicular to the path of said track, and a plurality of rollers caged in said track movable along the path thereof, said plunger having an end portion normally projecting into said track dimensioned so that the rollers occupy the entire length of said track when said plunger is in the normally projecting position, resilient means urging said plunger into the normally projecting position, and means for displacing said plunger in opposition to said resilient means.

3. In combination with a pair of concentrically disposed members arranged for relative axial movement, incremental latching means for adjustably positioning said members through a predetermined range of said relative movement comprising a recessed track of finite length formed in one of said members along a path parallel to the direction of movement thereof, a plunger element reciprocally mounted on the other of said members for movement through a linear path perpendicular to the path of said track, and a plurality of rollers caged in said track movable along the path thereof, said plunger having an end portion normally projecting into said track dimensioned so that the rollers occupy the entire length of said track when said plunger is in the normally projecting position, resilient means urging said plunger into the normally projecting position, and means for displacing said plunger in opposition to said resilient means.

4. In combination with a pair of members arranged for relative angular movement about a fixed axis, incremental latching means for adjustably positioning said members through a predetermined range of said relative movement comprising a recessed track of finite length formed in one of said members along a path parallel to the direction of movement thereof, a plunger element mounted on the other of said members for movement through a fixed path perpendicular to the path of said track, and a plurality of rollers caged in said track movable along the path thereof, said plunger having an end portion normally projecting into said track dimensioned so that the rollers occupy the entire length of said track when said plunger is in the normally projecting position.

5. A latch mechanism comprising a first member having an elongated recess formed therein including end abutment portions defining the major dimension, a plurality of rollers caged in said recess occupying less than the major dimension thereof and movable in the direction of elongation, a second member having a reciprocal plunger mounted thereon movable into said recess to intersect the path of movement of said rollers and dimensioned so as to occupy a space equal to the difference between the space occupied by said rollers and the major dimension of said recess.

6. In an adjustable steering column assembly including an upper movable jacket portion arranged for telescoping movement relative to a fixed jacket portion, a support arranged for reciprocal movement with said fixed jacket and connected in spaced relation to said movable jacket, means forming a longitudinally elongated recess in said support radially adjacent said fixed jacket, means forming abutment portions at opposite ends of said recess defining the longitudinal dimension thereof, a plunger reciprocally mounted on said fixed jacket for movement perpendicular to the longitudinal plane of said recess and normally extending therein, and a plurality of longitudinally movable rollers caged in said recess, said rollers being of uniform diameter and dimensioned so as to occupy all of the longitudinal dimension of said recess exclusive of the space occupied by said plunger.

7. The structure set forth in claim 6 wherein the width of said plunger in the plane of said recess corresponds to the diameter of said rollers.

8. The structure set forth in claim 6 including a tiltably adjustable steering wheel mounted upwardly adjacent the upper movable jacket portion.

9. In combination with a pair of members one of which is arranged for angular movement about a fixed axis formed on the other, incremental latching means for adjustably positioning said angularly movable member through a predetermined range of movement comprising a recessed track of finite length formed in said angularly movable member along a curved path generated from said fixed axis, a plunger element mounted on the other of said members for movement through a fixed path generally perpendicular to the path of said track, and a plurality of rollers caged in said track movable along the path thereof, said plunger having an end portion normally projecting into said track dimensioned so that the rollers occupy the entire length of said track when said plunger is in the normally projecting position.

References Cited by the Examiner

UNITED STATES PATENTS

| | | | |
|---|---|---|---|
| 1,226,411 | 5/1917 | Thomas | 74—493 |
| 3,090,633 | 5/1963 | Farnsworth | 74—527 X |
| 3,167,971 | 2/1965 | Zeigler et al. | 74—493 |

MILTON KAUFMAN, *Primary Examiner.*